(12) United States Patent
Champavere

(10) Patent No.: US 11,768,127 B2
(45) Date of Patent: *Sep. 26, 2023

(54) FIBER OPTIC VIRTUAL SENSING SYSTEM AND METHOD

(71) Applicant: Viavi Solutions France SAS, Plaisir (FR)

(72) Inventor: Andre Champavere, Saint-Bonnet les Oules (FR)

(73) Assignee: VIAVI SOLUTIONS FRANCE SAS, Plaisir (FR)

(*) Notice: Subject to any disclaimer, the term of this patent is extended or adjusted under 35 U.S.C. 154(b) by 119 days.

This patent is subject to a terminal disclaimer.

(21) Appl. No.: 17/407,881

(22) Filed: Aug. 20, 2021

(65) Prior Publication Data

US 2021/0381927 A1 Dec. 9, 2021

Related U.S. Application Data

(63) Continuation of application No. 16/450,363, filed on Jun. 24, 2019, now Pat. No. 11,125,647.

(30) Foreign Application Priority Data

Apr. 9, 2019 (EP) .................................... 19305460

(51) Int. Cl.
*G01M 11/00* (2006.01)
(52) U.S. Cl.
CPC .... *G01M 11/3145* (2013.01); *G01M 11/3136* (2013.01)

(58) Field of Classification Search
CPC .......... G01M 11/3145; G01M 11/3136; G01J 1/0219; G01J 1/0242; G01J 1/4228; G01J 2001/4266; E06B 9/24; E06B 2009/2464; E06B 2009/6818; E06B 2009/6827; G01W 1/12

See application file for complete search history.

(56) References Cited

U.S. PATENT DOCUMENTS

| | | | |
|---|---|---|---|
| 5,757,487 A * | 5/1998 | Kersey | G01D 5/35383 |
| | | | 356/478 |
| 6,067,150 A | 5/2000 | Beller et al. | |
| 8,208,134 B1 * | 6/2012 | Gunal | G01M 11/088 |
| | | | 356/73.1 |
| 2005/0259242 A1 | 11/2005 | Bridge et al. | |
| 2006/0028637 A1 * | 2/2006 | Payton | G01M 11/3172 |
| | | | 356/73.1 |
| 2006/0127004 A1 * | 6/2006 | Waters | G02B 6/29322 |
| | | | 398/28 |
| 2011/0176811 A1 | 7/2011 | Tietjen | |
| 2012/0143521 A1 | 6/2012 | Chen et al. | |

(Continued)

*Primary Examiner* — Jamil Ahmed
(74) *Attorney, Agent, or Firm* — Mannava & Kang, P.C.

(57) ABSTRACT

In some examples, fiber optic virtual sensing may include generating, by a virtual sensor generator that is operatively connected to a device under test (DUT), at least one virtual sensor along the DUT. A DUT interrogator may be operatively connected to the DUT to transmit a stimulus optical signal into the DUT. The DUT interrogator may analyze reflected light resulting from the transmitted stimulus optical signal. The DUT interrogator may determine, based on the analysis of the reflected light, an attribute of the DUT sensed by the at least one virtual sensor.

18 Claims, 12 Drawing Sheets

(56) References Cited

U.S. PATENT DOCUMENTS

| | | | |
|---|---|---|---|
| 2013/0042415 A1* | 2/2013 | Jaaskelainen | G01K 11/32 8/103 |
| 2013/0170786 A1 | 2/2013 | Wang et al. | |
| 2013/0223846 A1* | 8/2013 | Joseph | H01S 5/005 398/118 |
| 2016/0252414 A1* | 9/2016 | Preston | G01M 11/3145 356/32 |
| 2016/0356670 A1 | 12/2016 | Brillhart et al. | |

* cited by examiner

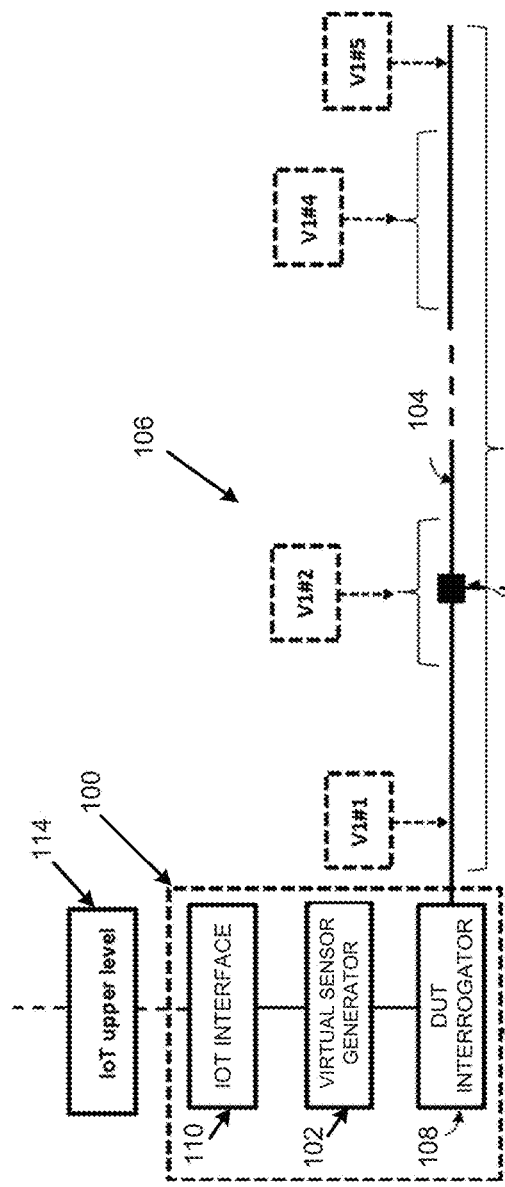
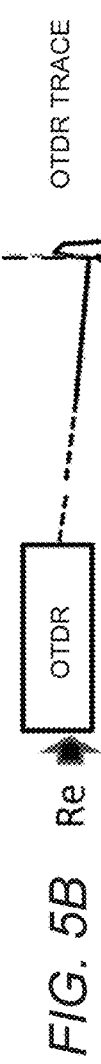
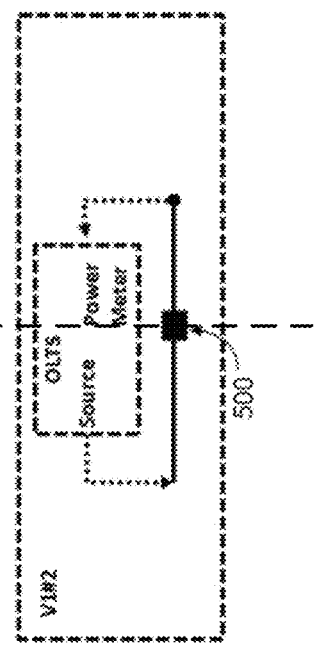
FIG. 5A
FIG. 5B
FIG. 5C

1000

GENERATE AT LEAST ONE VIRTUAL SENSOR ALONG A DEVICE UNDER TEST (DUT)
1002

TRANSMIT A STIMULUS OPTICAL SIGNAL INTO THE DUT
1004

ANALYZE REFLECTED LIGHT RESULTING FROM THE TRANSMITTED STIMULUS OPTICAL SIGNAL
1006

DETERMINE, BASED ON THE ANALYSIS OF THE REFLECTED LIGHT, AN ATTRIBUTE OF THE DUT SENSED BY THE AT LEAST ONE VIRTUAL SENSOR
1008

*FIG. 10*

FIBER OPTIC VIRTUAL SENSING SYSTEM AND METHOD

PRIORITY

This patent application is a Continuation of commonly assigned and co-pending U.S. patent application Ser. No. 16/450,363, filed Jun. 24, 2019, which claims priority under 35 U.S.C. 119(a)-(d) to European patent application number 19305460.8, having a filing date of Apr. 9, 2019, the disclosures of which are hereby incorporated by reference in their entireties.

BACKGROUND

A fiber optic cable may include one or more optical fibers. The optical fibers may transmit light from a source to a destination. The transmitted light may be backscattered and reflected. The backscattered and reflected light may be analyzed to determine properties of the optical fibers.

BRIEF DESCRIPTION OF DRAWINGS

Features of the present disclosure are illustrated by way of example and not limited in the following figure(s), in which like numerals indicate like elements, in which:

FIGS. 5A-5C illustrate application in a telecommunications domain to illustrate operation of the fiber optic virtual sensing system of FIG. 1A in accordance with an example of the present disclosure;

FIG. 10 illustrates a flowchart of an example method for fiber optic virtual sensing in accordance with an example of the present disclosure.

DETAILED DESCRIPTION

Figure 1A:
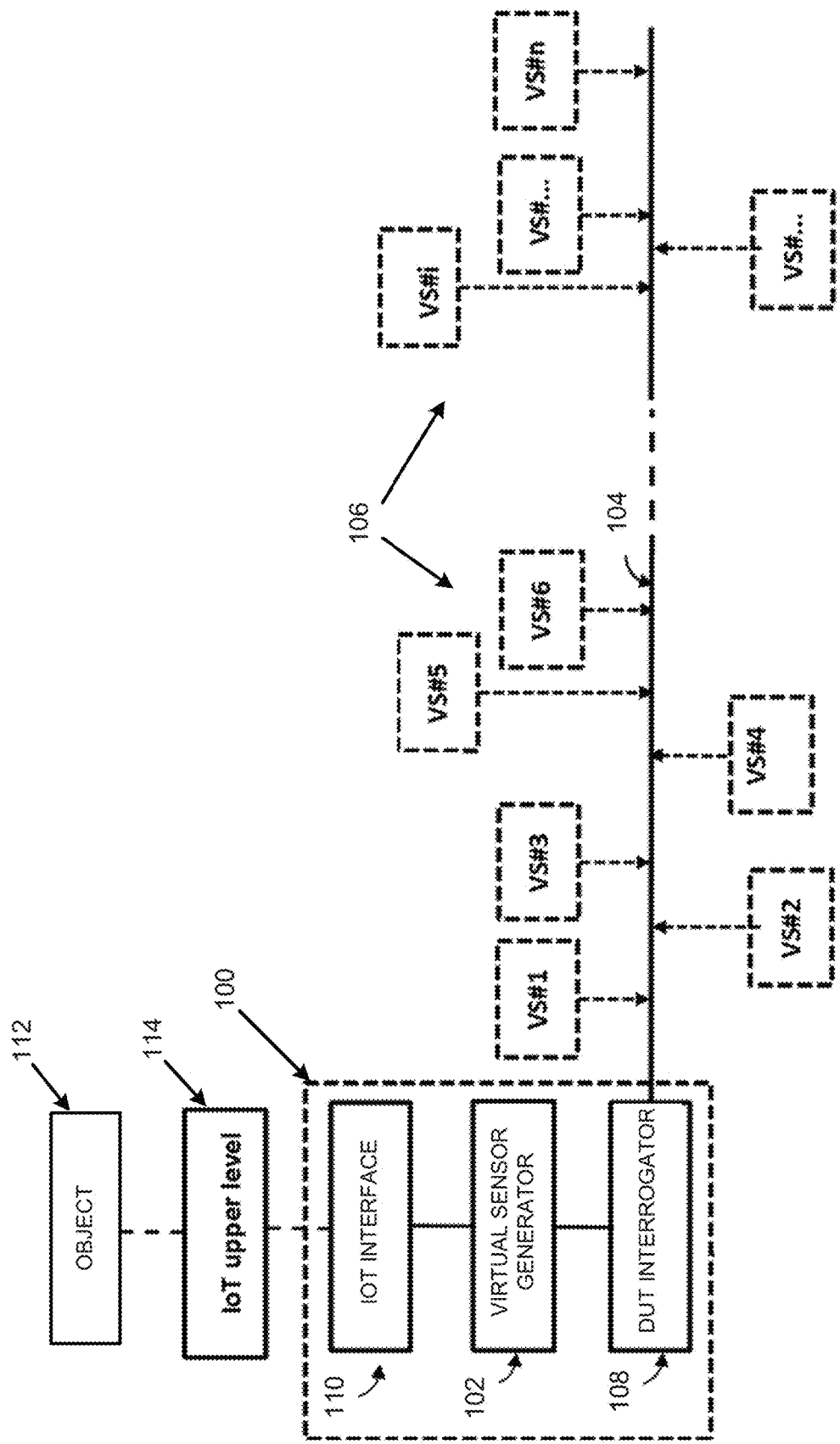
FIG. 1A illustrates an operational layout of a fiber optic virtual sensing system in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Fiber optic virtual sensing systems, and methods for fiber optic virtual sensing are disclosed herein. The systems and methods disclosed herein provide for the configuration of a physical location of a measurement area of a plurality of virtual sensors along an optical fiber for measuring physical parameters of interest, such as optical loss, based, for example, on fiber optic reflectometry measurement.

With respect to an infrastructures, such as an Internet of Things (IoT) infrastructure, such an infrastructure may include objects equipped with sensors, actuators, and processors that communicate with each other to serve a meaningful purpose. Such an infrastructure may process and react to physical and virtual information. Through data collection and analysis, such an infrastructure may achieve a multitude of outcomes that may provide for improvement of user experience or the performance of devices and systems. In this regard, when a plurality of sensors has to be installed to cover an entire area that is to be sensed, for example, for an IoT infrastructure, it is technically challenging to deploy individual sensors at key locations without risking missing an event.

The systems and methods disclosed herein address at least the aforementioned technical challenges by implementing virtual sensors that may be associated with other types of connected objects, sensors, hybrids, real connected objects, as well as test, measurement, and monitoring probes or instruments. The systems and methods disclosed herein may provide for access of data, as well as configuration of these virtual sensors as to an entire network of connected objects.

According to examples disclosed herein, the systems and methods disclosed herein may eliminate the need for manual intervention with respect to maintenance operations or reconfiguration of sensors that are used to monitor a specified area.

According to examples disclosed herein, the systems and methods disclosed herein may implement optical fiber reflectometry by utilizing a backscattering signal along an optical fiber to extract values of different measurements such as optical attenuation of all or part of a fiber link. Examples of other values that may be extracted may include temperature, mechanical stress, as well as detection of an acoustic wave at different points of an optical fiber.

According to examples disclosed herein, for the systems and methods disclosed herein, Internet of Things (IoT)

distributed reflectometry (IoT-DR) may be used to create virtual instruments or systems that may be positioned at different locations on a device under test (DUT) to measure several physical parameters of the DUT. In addition to distributed loss and return loss measurement, and based on optical reflectometry (e.g., Rayleigh, Raman, or Brillouin), the systems and methods disclosed herein may extend to the distributed measurement of multiple parameters such as temperature, elongation of a DUT, acoustic signals, and radiation measurements.

According to examples disclosed herein, the systems and methods disclosed herein may be compatible with the IoT in terms of connectivity using wireless networks, such as a 5G network, or fiber-only end-to-end solutions. Further, the systems and methods disclosed herein may be embedded in mobile structures or vehicles using a wireless connectivity, such as through a 5G network.

In certain IoT system architectures, data processing may be performed in a large centralized environment by cloud computers or by fog or edge computing, where the sensors and network gateways may perform a part of the data processing and analytics. In this regard, according to examples disclosed herein, the systems and methods disclosed herein utilizing virtual sensors may include different footprints on IoT layers.

A fog computing based architecture may present a layered approach which may insert monitoring, preprocessing, storage, and security layers between physical and transport layers. In this regard, processing capabilities, data storage capacity, network bandwidth and/or latency requirements may need to be taken into account. Fog or edge computing solutions may aim to process data near a data source, while moving applications, services, data, computing power, and decision making away from centralized nodes. In this regard, the system disclosed herein may include pre-processing and data storage capacity that may reduce the data that needs to be transferred to a transport layer. For example, limited key data may be exchanged, such as general data analytics, an optical time domain reflectometer (OTDR) event table, workflow data, or a temperature in the case of a fire detection application. In this regard, a hybrid configuration of the system disclosed herein may offer cloud or edge computing functionality. Local processing or pre-processing using advanced technics such as artificial intelligence may limit data exchanges for making decisions locally.

As some potential applications of the systems and methods disclosed herein may be dedicated to a single organization, the infrastructure of the system disclosed herein may be provisioned for a single organization. In this regard, the systems and methods disclosed herein may incorporate different models of cloud technologies, such as a private cloud, a public cloud, or a hybrid cloud.

The systems and methods disclosed herein may be integrated into a global real-time test, analysis and optimization solution, embedded in a specified network. In the field of telecommunications, 5G wireless or enterprise networks, data from the virtual sensors or virtual instrument probes may be used as service and service test and activation data for planning, provisioning, preventative maintenance, insurance and maintenance, and network optimization.

According to examples disclosed herein, the systems and methods disclosed herein may provide for the installation of IoT networks based on optical reflectometry that may operate as an IoT based monitoring system for manipulating virtually mobile probes along a DUT, and also reconfigurable virtual OTDR probes or fiber optic virtual sensors for temperature, strain, acoustic, vibration or third party intrusion detection.

According to examples disclosed herein, the systems and methods disclosed herein may be integrated in an application, and/or may be connected to other IoT devices used for telecommunication or sensing applications for managing an entire IoT system.

With respect to fiber network element integrity, assurance of fiber network elements may include more other aspects in addition to performance monitoring and troubleshooting of a telecommunication functionality. Performance of the underlying infrastructure (e.g., including the fiber, the cable, and its environment) may also affect a desired telecom functionality, and may be included in monitoring and troubleshooting equipment. For example, distributed strain measurement may proactively locate some fiber breaks that may not be seen by loss measurements. In the manner, distributed acoustic measurement may proactively locate damage sustained by fiber cable structures when work is completed nearby, or may also detect third party intrusion.

According to examples disclosed herein, the systems and methods disclosed herein may provide for awareness of measurement sensor locations (e.g., which may include virtual sensors as disclosed herein), for example, based on time-of-flight by reflectometry.

According to an example of implementation of the systems and methods disclosed herein, the systems and methods may be used to monitor a fiber section of a fiber cable deployed in a relatively harsh environment or suspected to show some performance drifts such as fiber attenuation increase or aging. First, the fiber section location may be set-up. Thereafter, different available options, such as fiber loss monitoring, fiber bending loss, fiber temperature monitoring, strain monitoring, and/or acoustic monitoring may be selected to detect voluntary or involuntary activities close to the fiber cable under monitoring (e.g., the DUT as disclosed herein). Thereafter, virtual sensors may be configured and/or moved to this specific location. For example, certain thresholds may be defined to trigger alarms or perform preset actions. Some correlations may be identified by comparing optical loss increase and temperature variation or other measurands such as strain, or acoustic or vibration signals. Measurement parameters such as duration or time windows, distance resolution, and others may be adjusted before launch of the measurement.

According to another example of implementation of the systems and methods disclosed herein, the systems and methods may include monitoring of the deployment of a fiber network. The different types of virtual sensors may be moved along the network following its construction to perform test, troubleshooting, and fiber characterization. Distributed fiber optic measurements may be combined with portable solutions to extend the capabilities in terms of virtual sensor types and performances.

According to another example of implementation of the systems and methods disclosed herein, the systems and methods may be used to perform optic distributed acoustic sensing for third party intrusion detection. In such an application, a mobile virtual sound detector may be located along a fiber section close to a work area near the fiber cable (e.g., the DUT as disclosed herein) to detect potential impact or damage on the fiber cable, or a water or gas pipe equipped with a fiber optic.

FIG. 1A illustrates an operational layout of a fiber optic virtual sensing system (hereinafter also referred to as "system 100") in accordance with an example of the present disclosure.

Referring to FIG. 1A, the system 100 may include a virtual sensor generator 102 that is operatively connected to a device under test (DUT) 104 to generate one or more virtual sensors 106 (illustrated as VS #1, VS #2, VS #3, . . . , VS #n) along the DUT 104. The virtual sensor generator 102 may also be denoted as a processing, monitoring, and virtualization unit.

According to examples disclosed herein, the DUT 104 may include an optical fiber.

A DUT interrogator 108 that is operatively connected to the DUT 104 may transmit a stimulus optical signal into the DUT 104. The DUT interrogator 108 may also be denoted as a distributed fiber-optic interrogation unit. The DUT interrogator 108 may analyze reflected light resulting from the transmitted stimulus optical signal. Further, the DUT interrogator 108 may determine, based on the analysis of the reflected light, an attribute of the DUT 104 sensed by the one or more virtual sensors 106.

An Internet of Things (IoT) interface 110 may be operatively connected to an object 112 (or a plurality of objects) to transmit the attribute of the DUT 104 to the object 112. In this regard, an operation of the object 112 may be controlled based on the transmitted attribute of the DUT 104. Further, the IoT interface 110 may be operatively connected to the object 112 via an IoT upper level described with reference to FIG. 2.

According to examples disclosed herein, the DUT interrogator 108 may be operatively connected to the DUT 104 to analyze reflected light resulting from the transmitted stimulus optical signal by analyzing Rayleigh scattering resulting from the transmitted stimulus optical signal.

According to examples disclosed herein, the DUT interrogator 108 may be operatively connected to the DUT 104 to analyze reflected light resulting from the transmitted stimulus optical signal to measure insertion loss of a fiber optic component disposed at a location along the DUT 104.

According to examples disclosed herein, the one or more virtual sensors 106 may include a loss test sensor that includes an optical source and a power meter to measure event loss associated with the fiber optic component.

According to examples disclosed herein, the one or more virtual sensors 106 may include a fiber section optical loss sensor to measure optical attenuation associated with a section of the DUT 104.

According to examples disclosed herein, the one or more virtual sensors 106 may include a fiber section temperature sensor to measure temperature associated with a section of the DUT 104.

According to examples disclosed herein, the one or more virtual sensors 106 may include a fiber section strain sensor to measure strain associated with a section of the DUT 104.

According to examples disclosed herein, the DUT interrogator 108 may be operatively connected generally adjacent to a first end of the DUT 104. In this regard, as disclosed herein with reference to FIG. 7, another DUT interrogator may be operatively connected generally adjacent to a second end of the DUT 104 that is generally opposite to the first end of the DUT 104 to transmit a further stimulus optical signal into the DUT 104 in a direction from the second end of the DUT 104 towards the first end of the DUT 104. The other DUT interrogator may analyze further reflected light resulting from the transmitted further stimulus optical signal. Further, the other DUT interrogator may determine, based on the analysis of the further reflected light, another attribute of the DUT 104 sensed by the one or more virtual sensors 106.

Operation of the system 100 is described in further detail with reference to FIGS. 1A-9.

Referring again to FIG. 1A, the system 100 may represent a physical unit that is operatively connected to an end of the DUT 104. As disclosed herein, the virtual sensor generator 102 may be operatively connected to the DUT 104 to generate one or more virtual sensors 106 (illustrated as VS #1, VS #2, VS #3, . . . , VS #n) along the DUT 104. In this regard, the creation of a virtual sensor along the fiber optic path (e.g., the DUT 104) connected to one or several virtual sensor generators optically connected to the fiber network may be performed by defining the type of virtual sensor or the measurement feature associated with the virtual sensor. The point location or the fiber segment location of the virtual sensor may also be defined. Thereafter, the virtual sensor may be configured, and the DUT interrogator 108 may be launched. When defining the virtual sensor location or moving the virtual sensor to a new location, the virtual sensor generator 102 may update a list of available virtual sensor types or measurement types.

Figure 1B:
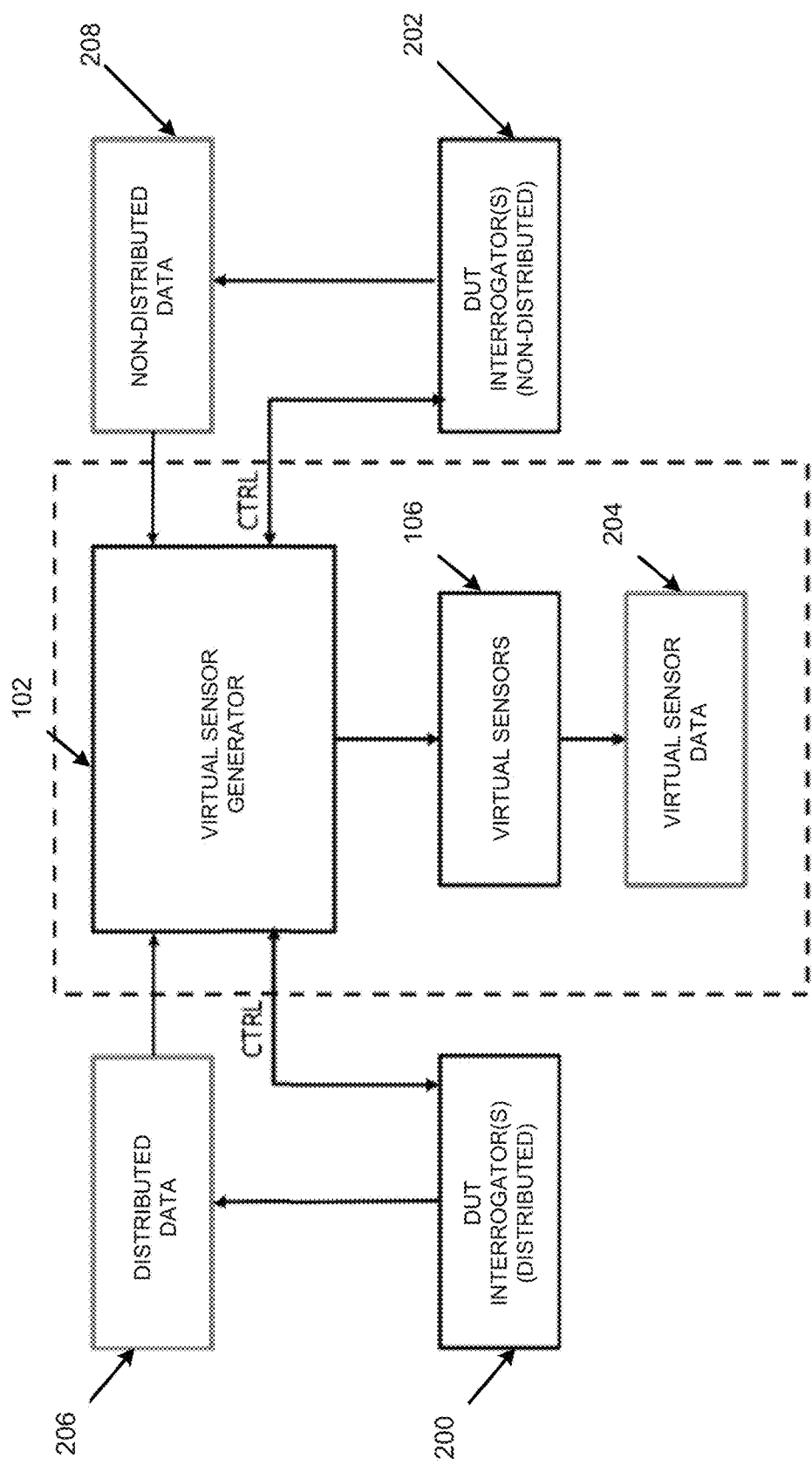
FIG. 1B illustrates further details of an operational layout of the fiber optic virtual sensing system of FIG. 1A in accordance with an example of the present disclosure.

Referring next to FIG. 1B, FIG. 1B illustrates further details of an operational layout of the system 100 in accordance with an example of the present disclosure.

As shown in FIG. 1B, according to examples disclosed herein, the system 100 may include one or more DUT interrogators at 200 (similar to DUT interrogator 108) for distributed fiber optic sensing, and one or more DUT interrogators at 202 (similar to DUT interrogator 108) for non-distributed fiber optic sensing, which the DUT interrogators may be physically connected to a fiber network. The DUT interrogator at 200 may represent a distributed fiber-optic sensing system that measures meuarands by means of optical fibers functioning as linear sensors. For example, distributed fiber-optic temperature sensing systems (DTS) may include devices that measure temperature by means of optical fibers functioning as linear sensors. In this case, temperatures may be recorded along the optical sensor cable, thus not at points, but as a continuous profile. In the same manner, distributed optical loss using OTDR techniques may include devices that obtain the loss by means of Rayleigh backscattering, and fiber losses may be recorded along the optical fiber, thus not at points, but as a continuous profile (e.g., OTDR trace).

The DUT interrogator at 202 may represent a non-distributed fiber-optic sensor or units that include point solutions that may not give any continuous profile. For example, a power meter connected to an optical fiber end may generate the level of optical power measured at the end of the optical fiber (e.g., single-point).

With respect to the DUT interrogator at 200, in the distributed fiber-optic sensing domain, the instrument connected to the optical fiber may be referred to as an interrogator. However, in a telecommunications domain for distributed loss measured, the instrument connected to the optical fiber may be referred to at a fiber monitoring system or an optical test unit (OUT) that includes an OTDR plug-in unit.

In a telecommunications domain, the virtual sensors 106 may be referred to as virtual fiber-optic measurement instruments, such as a virtual OTDR, virtual power meter, virtual loss test set, etc.

The virtual sensor data at 204 may be generated by the virtual sensors 106. The virtual sensors 106 may be defined based on the distributed fiber-optic data at 206. Further, the virtual sensors 106 may also be defined based on other data (e.g., the non-distributed fiber-optic data at 208) from non-distributed fiber-optic (e.g., real) sensors. For example, the distributed fiber-optic data at 206 may be the distributed temperature data along an optical fiber, plus the distributed fiber-optic loss data from a fiber monitoring system. The non-distributed fiber-optic data at 208 may be the power measurement (e.g., point measurement, non-distributed) data from a real (e.g., non-virtual) power meter connected to one end of an optical fiber.

The virtual sensor generator 102 may also be referred to as a virtualization engine to generate the virtual sensors 106 as disclosed herein. The virtual sensor generator 102 may utilize the distributed fiber-optic data at 206 and the non-distributed fiber-optic data at 208 to define the virtual sensors 106. For example, the distributed fiber-optic data at 206 may include data such as acquisition samples and associated results from measurement made on these data, and recorded along the optical fiber, and the non-distributed fiber-optic data at 208 may include data from point measurements if any.

Figure 2:
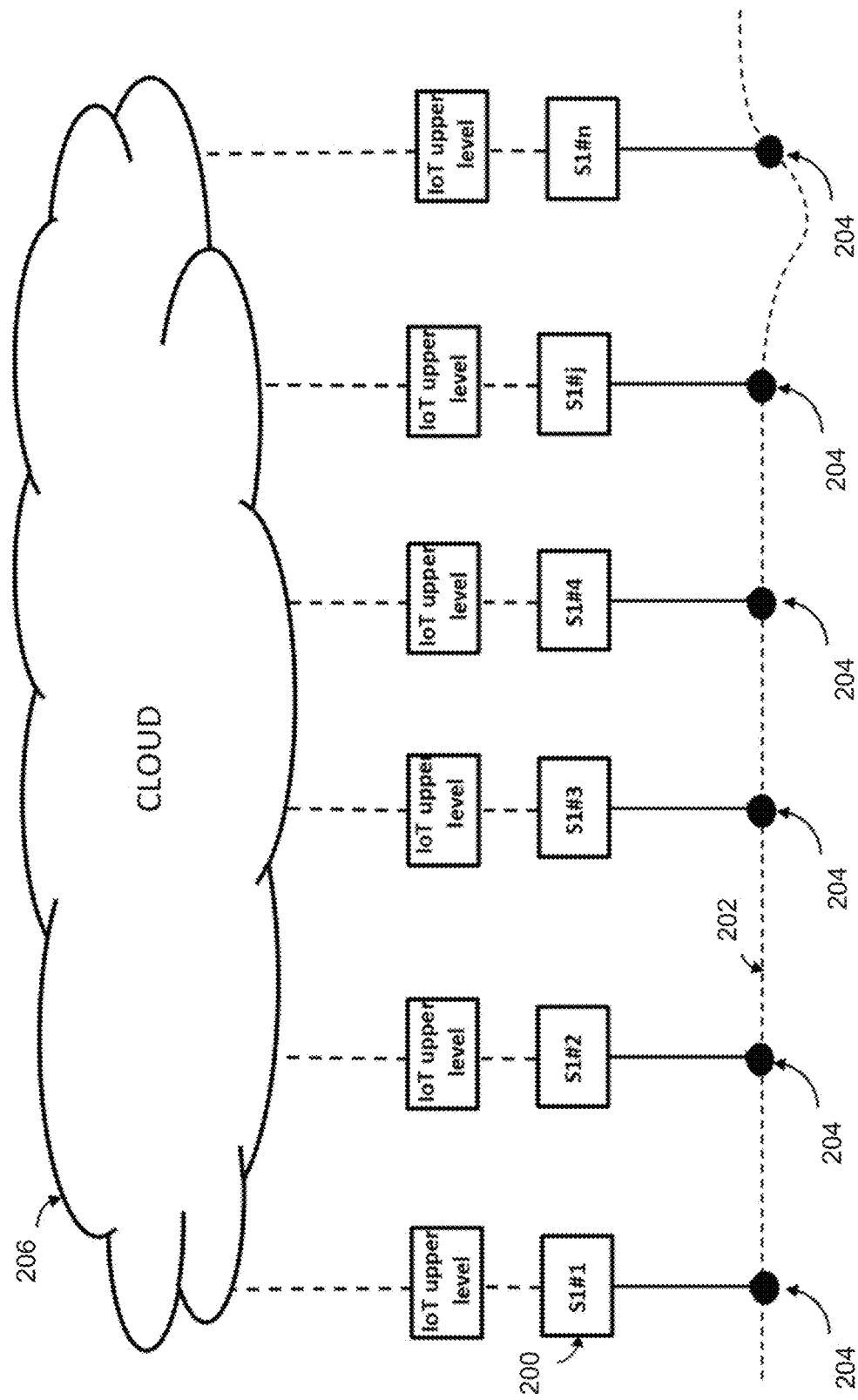
FIG. 2 illustrates a linear sensor array configuration where multiple independent measuring sensors are deployed in a geometric pattern to cover a full length of a sensing path to illustrate operation of the fiber optic virtual sensing system of FIG. 1A in accordance with an example of the present disclosure.

Referring next to FIG. 2, FIG. 2 illustrates a linear sensor array configuration where multiple independent measuring sensors 200 (which may include the virtual sensors 106) are deployed in a geometric pattern 202 to cover a full length of a sensing path to illustrate operation of the system 100 in accordance with an example of the present disclosure. In this regard, sensing points 204 may be deployed at fixed locations. The sensors in FIG. 2 are illustrated as S1 #1, S1 #2, . . . , S1 #n. Communication between the sensors 200 may be implemented via an interface, such as a Cloud interface 206.

As shown in FIG. 2, using a sensor array may add new dimensions to an observation with respect to the object 112, which may thus increase performance and/or capabilities of the system 100. A linear array may also be spatially deployed in three-dimensional geometric patterns to monitor multidimensional structures.

For the example of FIG. 2 based on an IoT structure, the layer including the sensing points 204 may represent a perception layer that may perceive physical properties of things that are part of the IoT. The layer including the sensors 200 may represent a network layer that is responsible for processing received data from the perception layer. Additionally, the network layer may transmit data to an application layer (e.g., the IoT upper level) through various network technologies, such as wireless or wired networks, and local area networks (LAN). The transport layer may transfer sensor data from the perception layer to a processing layer, and vice versa through networks. In some examples, the data processing may be performed in a relatively large centralized manner by cloud computers, or by fog or edge computing, where sensors and network gateways perform a part of the data processing and analytics. In this regard, a fog architecture may represent a layered approach that inserts monitoring, preprocessing, storage, and security layers between physical and transport layers.

Figure 3:
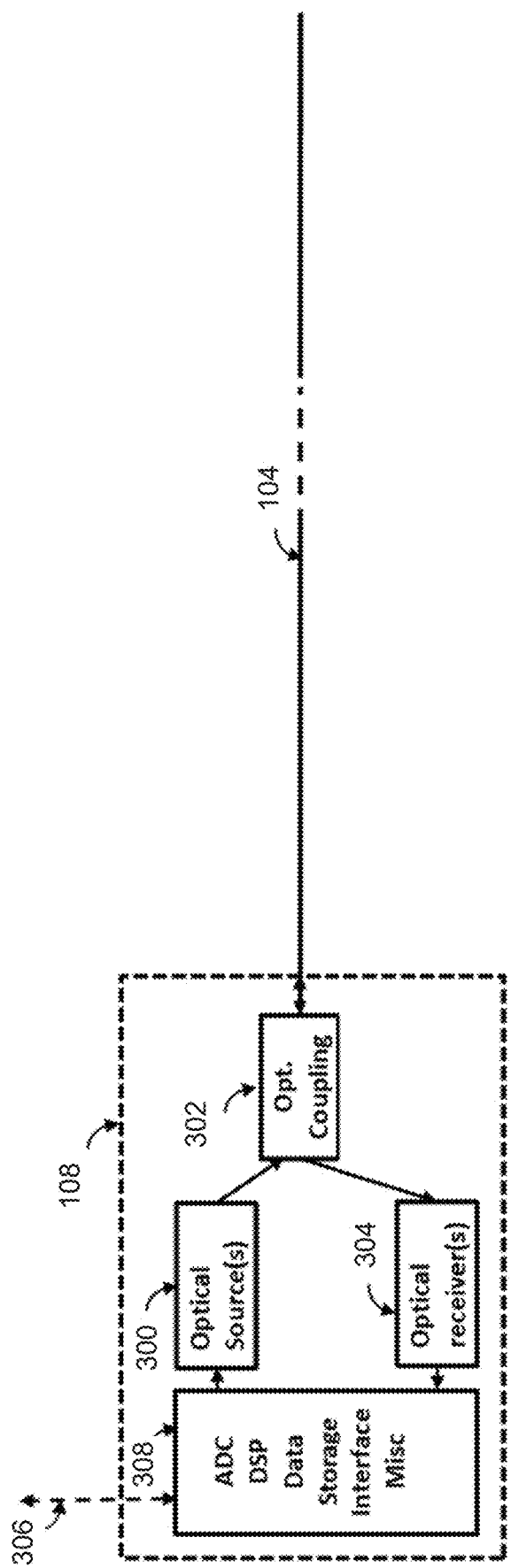
FIG. 3 illustrates a simplified architecture of a device under test (DUT) interrogator of the fiber optic virtual sensing system of FIG. 1A in accordance with an example of the present disclosure.

Referring next to FIG. 3, FIG. 3 illustrates a simplified architecture of the DUT interrogator 108 of the system 100 in accordance with an example of the present disclosure. The DUT interrogator 108 may be utilized for test and monitoring of the DUT xxx, or for distributed fiber-optic sensing using one or multiple physical phenomena such as Rayleigh scattering, Brillouin scattering, or Raman scattering. In this regard, under the general aspect of fiber optic reflectometry, several physical implementation options may exist based on different technologies from direct detection to coherent detection, from time domain to frequency domain, from power measurement to photon counting techniques, from pulse to correlation sequence modulation, and possible combinations of these. In this regard, irrespective of the technology used, the output may include a distributed fiber optic measurement with measurement data distributed all along the fiber, and utilized as disclosed herein.

For the DUT interrogator 108, an optical stimulus may be sent by the optical source 300 (e.g., a laser) coupled by an optical coupling unit 302 to the DUT 104. A signal received back at the input/output port of the DUT interrogator 108 may be coupled back to an optical receiver 304 through the optical coupling unit 302. The optical coupling unit 302 may embed optical switches to connect to several DUTs. Other components such as for pre-amplification, analog to digital conversion, signal processing, data processing and storage, interfaces, power supplies, and communication links 306 may be coupled into block 308.

In telecommunications or in other sensing domains, the system 100 may utilize a plurality of wavelengths to enable the aforementioned measurement principles. In this regard, several sources with different wavelengths may be utilized, and several wavelengths may be analyzed on a receiver side. In telecommunications, a domain of interest may include the optical properties of fiber link components such as optical fiber sections, and optical connections and components that affect transmission system performance. In this regard, an OTDR may be utilized to access optical fiber loss by measuring, for example, Rayleigh backscattering. In this case, the DUT 104 may be considered as a transducer that converts the backscatter signal to optical loss (e.g., parameter of interest) distributed along the DUT 104. In a similar manner, in distributed temperature, strain, or acoustic measurements, the optical fiber may still be the transducer, but may utilize Raman, Brillouin, or even Rayleigh backscattering.

Figure 4:
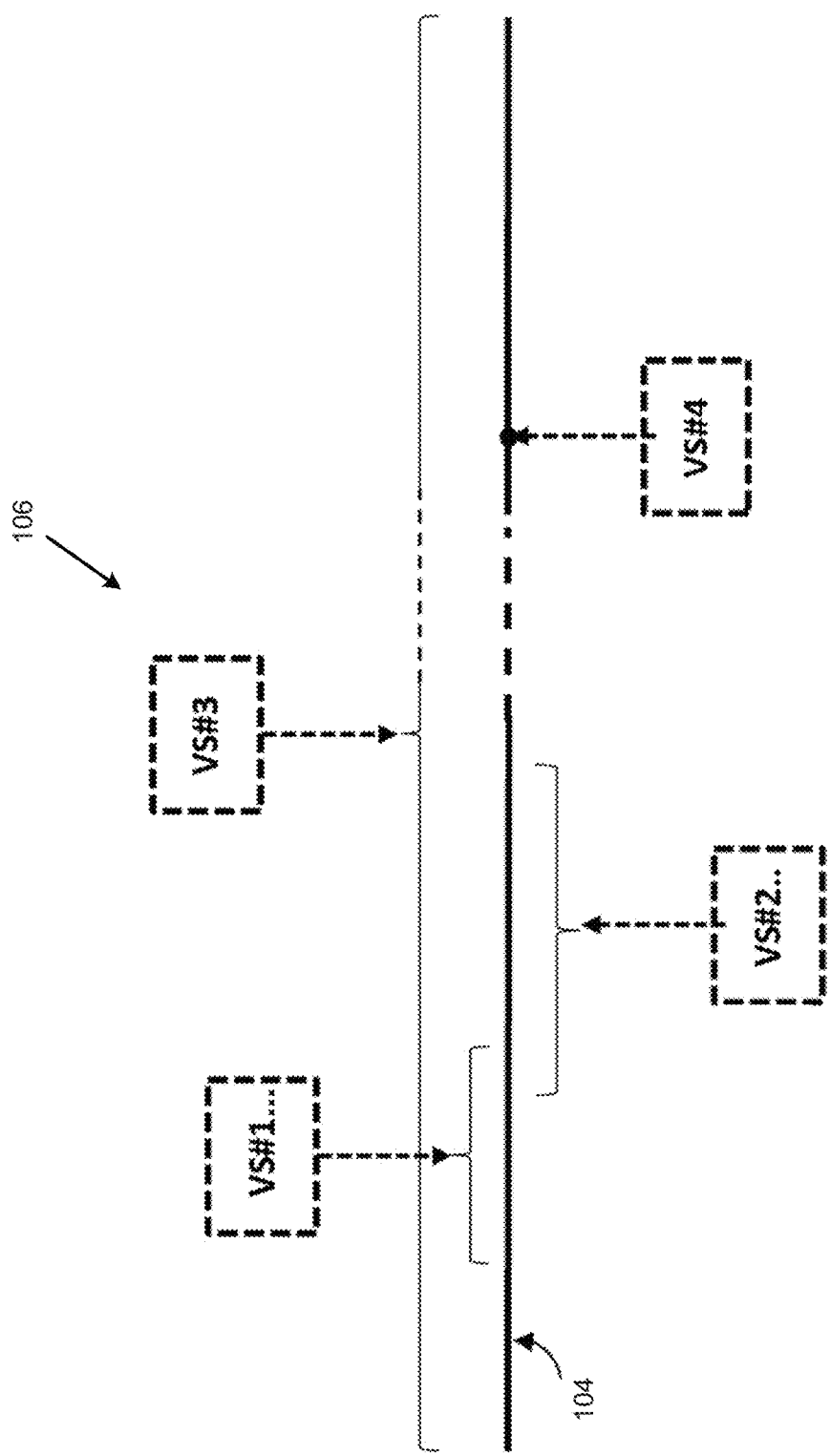
FIG. 4 illustrates deployment of virtual sensors to illustrate operation of the fiber optic virtual sensing system of FIG. 1A in accordance with an example of the present disclosure.

FIG. 4 illustrates deployment of virtual sensors 106 to illustrate operation of the system 100 in accordance with an example of the present disclosure.

Referring to FIG. 4, according to examples disclosed herein, the virtual sensor generator 102 may be operatively connected to the DUT 104 to generate the one or more virtual sensors 106 along the DUT 104 by generating the one or more virtual sensors 106 (e.g., VS #1 and VS #2) to sense a property of the DUT 104 along a specified length of the DUT 104 that is less than an entire length of the DUT 104.

According to examples disclosed herein, the virtual sensor generator 102 may be operatively connected to the DUT 104 to generate the one or more virtual sensors 106 along the DUT 104 by generating the one or more virtual sensors 106 (e.g., VS #3) to sense a property of the DUT 104 along an entire length of the DUT 104.

According to examples disclosed herein, the virtual sensor generator 102 may be operatively connected to the DUT 104 to generate the one or more virtual sensors 106 along the DUT 104 by generating the one or more virtual sensors 106 (e.g., VS #4) to sense a property of the DUT 104 at a point along the DUT 104.

According to examples disclosed herein, the virtual sensor generator 102 may be operatively connected to the DUT 104 to move an existing virtual sensor from a first location to a second location along the DUT 104. For example, assuming that virtual sensor VS #1 is allocated to cover a section of the DUT 104 at a current location as shown in FIG. 4, VS #1 may be moved to cover a section that includes virtual sensor VS #4 to cover a broader range of the DUT 104 at the location of virtual sensor VS #4.

According to examples disclosed herein, the virtual sensor generator 102 may be operatively connected to the DUT 104 to remove an existing virtual sensor. For example, any of the virtual sensors shown in FIG. 4 may be removed.

FIGS. 5A-5C illustrate application in a telecommunications domain to illustrate operation of the system 100 in accordance with an example of the present disclosure.

Referring to FIG. 5A, according to an example, the DUT interrogator 108 may be based on Rayleigh optical time domain reflectometry. In the telecommunications domain, parameters of interest may include, for example, the DUT distributed loss and return loss. In this domain, some of the virtual sensors 106 may be defined to obtain measurement data to be used to determine DUT characterization parameters, and other virtual sensors may be used to trigger alarms. For example, virtual sensors VS #1 and VS #5 may be used to measure the total loss of the DUT 104, which may also be denoted as a link budget loss. For example, VS #1 may be configured as a point loss meter located at the near end of the DUT 104, while VS #5 may be located at the far end. Combining the measurements from both VS #1 and VS #2 may build a link budget loss meter with the budget loss of the link calculated from the difference of these two results (e.g., near end loss minus far end loss).

The virtual sensor VS #2 may be configured and used to measure the insertion loss or the reflectance of a fiber optic component 500, such as a fiber splice, an optical connector, an optical fiber splitter, or other inline optical components. For example, referring to FIG. 5C, virtual sensor VS #2 may be seen as a virtual optical loss test set (OLTS) connecting an optical source on one side and a power meter on the other side, and measuring the event loss by the difference of optical power injected on one side and power received on the other side, in a similar manner as a physical (e.g., non-virtual) OLTS. This virtual OLTS located at the splice location may be named as a "splice meter" that delivers splice insertion loss (IL) and reflectance (R). For network construction, a technician may select this virtual "splicemeter" (IL/R). For example, as shown in FIG. 5B, the real side may be considered with the insertion loss, and the reflectance measured with an OTDR may be considered using the attenuation slope before and after the event to estimate the vertical deviation at event location to estimate the event insertion loss. On the virtual side, the insertion loss may be measured using the same data points and aforementioned techniques, but seen as measured using a source and a powermeter. For maintenance and troubleshooting, monitoring probes may be added along the network on specific events, and may launch predictive maintenance on a specified area (e.g., fiber section, connection, etc.). In a monitoring mode, automated or artificial intelligence processes may be used to provide alarms, and root cause analysis.

The virtual sensor VS #4 may be configured to measure the loss of a fiber section, for example, to detect and monitor a possible degradation of the optical attenuation (e.g., due to aging). The virtual sensing loss meter may utilize the distributed measurement data of this fiber section using a real OTDR measurement to determine the loss, which may be seen as a virtual loss test set connected on this section.

The virtual sensor VS #5 may be configured to monitor the amplitude of an end of a fiber reflective device installed for DUT monitoring purpose.

The virtual sensor VS #3 that covers the overall length of the DUT 104 may access other measurements such as link optical return loss, or the complete fiber characterization including link events table and reflectometric trace. This configuration of the virtual sensor VS #3 may be similar to that of a physical sensor because the virtual sensor VS #3 may use all of the data set from the real instrument.

Other capabilities of an OTDR such as optical power source mode may translate as a virtual sensor that may be associated to the optical source of system 100 to build a continuous or modulated wave OLTS. In this regard, a plurality of virtual movable tools may be implemented, such as a virtual OTDR that may be moved along the DUT 104.

As disclosed herein, the system 100 may combine multiple wavelengths backscatter analysis to detect wavelength sensitive phenomena impacting DUT integrity. In this regard, the system 100 may also utilize other sensing techniques such as dual source Raman distributed fiber sensing, or strain and acoustic sensing.

The system 100 may utilize spatial, time, or optical frequency multiplexing to support concurrent operations such as out-of-band monitoring or in-service monitoring in the presence data traffic on the same DUT. The spatial multiplexing may use a witness fiber available in the cable or use an available core of a multicore fiber. Time division multiplexing may use different time windows for the different measurements.

Figure 6:
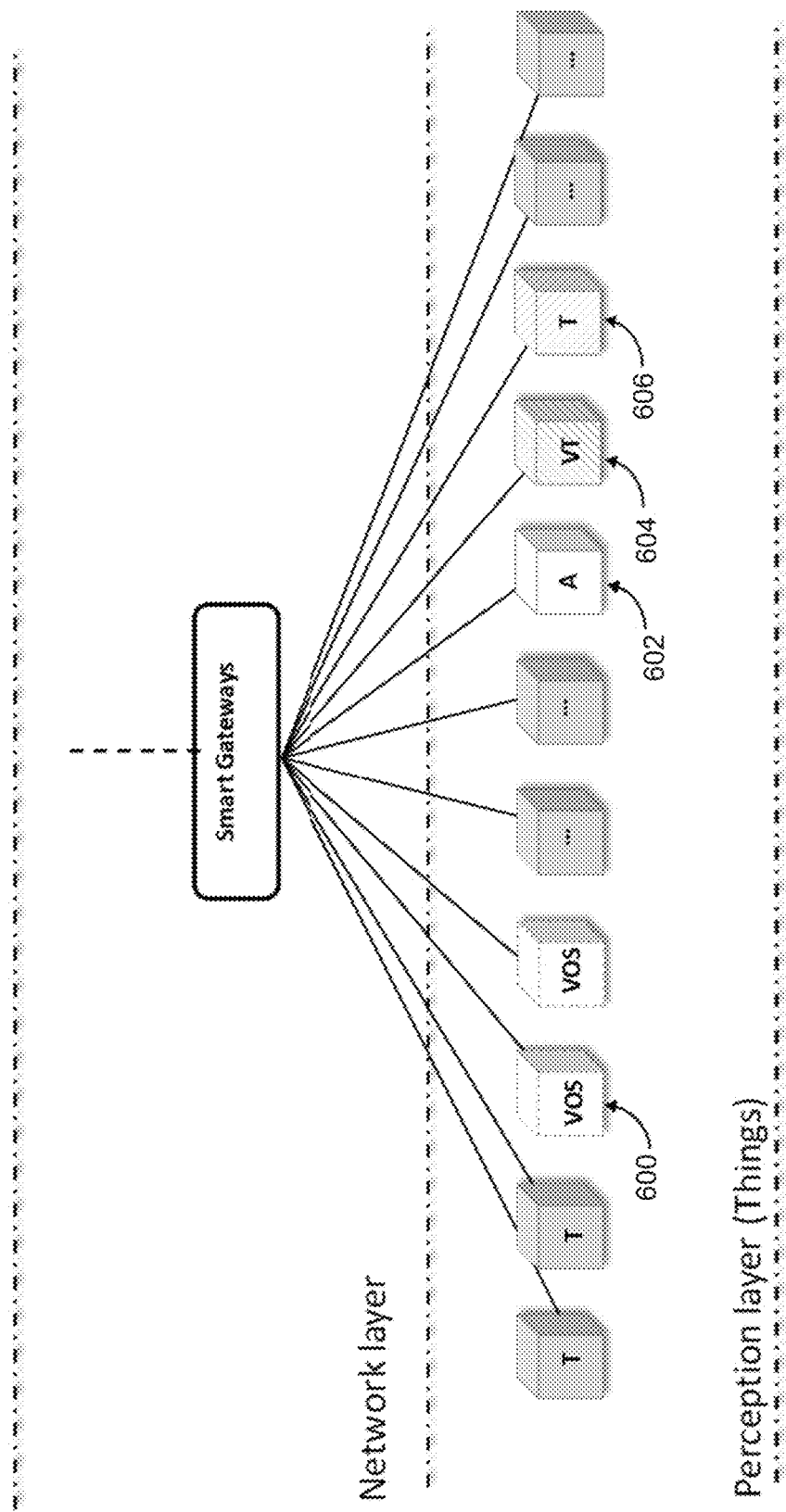
FIG. 6 illustrates different types of sensors to illustrate operation of the fiber optic virtual sensing system of FIG. 1A in accordance with an example of the present disclosure.

FIG. 6 illustrates different types of sensors to illustrate operation of the system 100 in accordance with an example of the present disclosure.

Referring to FIG. 6, the virtual sensors described in FIG. 6 may combine several types of sensors (e.g., optical loss sensors, temperature sensors, strain sensors, etc.). A combination of multiple parameters of interest may add new dimensions to the observation. As an example, the accurate distance localization of the fiber events in OTDR mode may facilitate other sensing modes to set-up virtual sensing sections. In this regard, the virtual sensors 106 may be combined to other virtual or real sensors as shown in FIG. 6. For example, a list of things may include between others virtual optical sensors 600, actuators 602, and other virtual 604 and non-virtual (real) 606 devices. In this regard, additional devices (e.g., "things" with respect to IoTs) may be added in terms of devices, sensors, and actuators.

For the system 100, since virtual IoTs are based on the use of the DUT 104 which may be passive (e.g., without any electronics, embedded software, or a power supply), the system 100 may be insensitive to electric fields, and may not be limited by the temperature operating range of electronic devices or batteries. Thus, without the need for a technician to physically go to a site, the virtual sensors 106 may be moved to measure a different point or area along the DUT 104. This capability may be beneficial for a sensing fiber environment that is non-accessible, for example, due to distance, security, limited access, safety, or other environmental conditions.

The DUT 104 may function as a linear array of transducers for several potential parameters of interest. For example, the DUT 104 may function as thousands or tens of thousands of transducers distributed along its length to offer a high scalability and rich possibility to deploy virtual sensors.

The DUT interrogator 108 may be shared between multiple virtual sensors 106 (as well as virtual IoTs). In this regard, virtual sensor software updates may be performed at the interrogator level, and apply to all virtual sensor networks (and virtual IoT networks). In this manner, each virtual IoT may be reconfigured by the DUT interrogator 108. Thus, new virtual sensors and/or virtual IoTs may be added at any time at different points or on different sections of the DUT 104, even on already measured areas.

Figure 7:
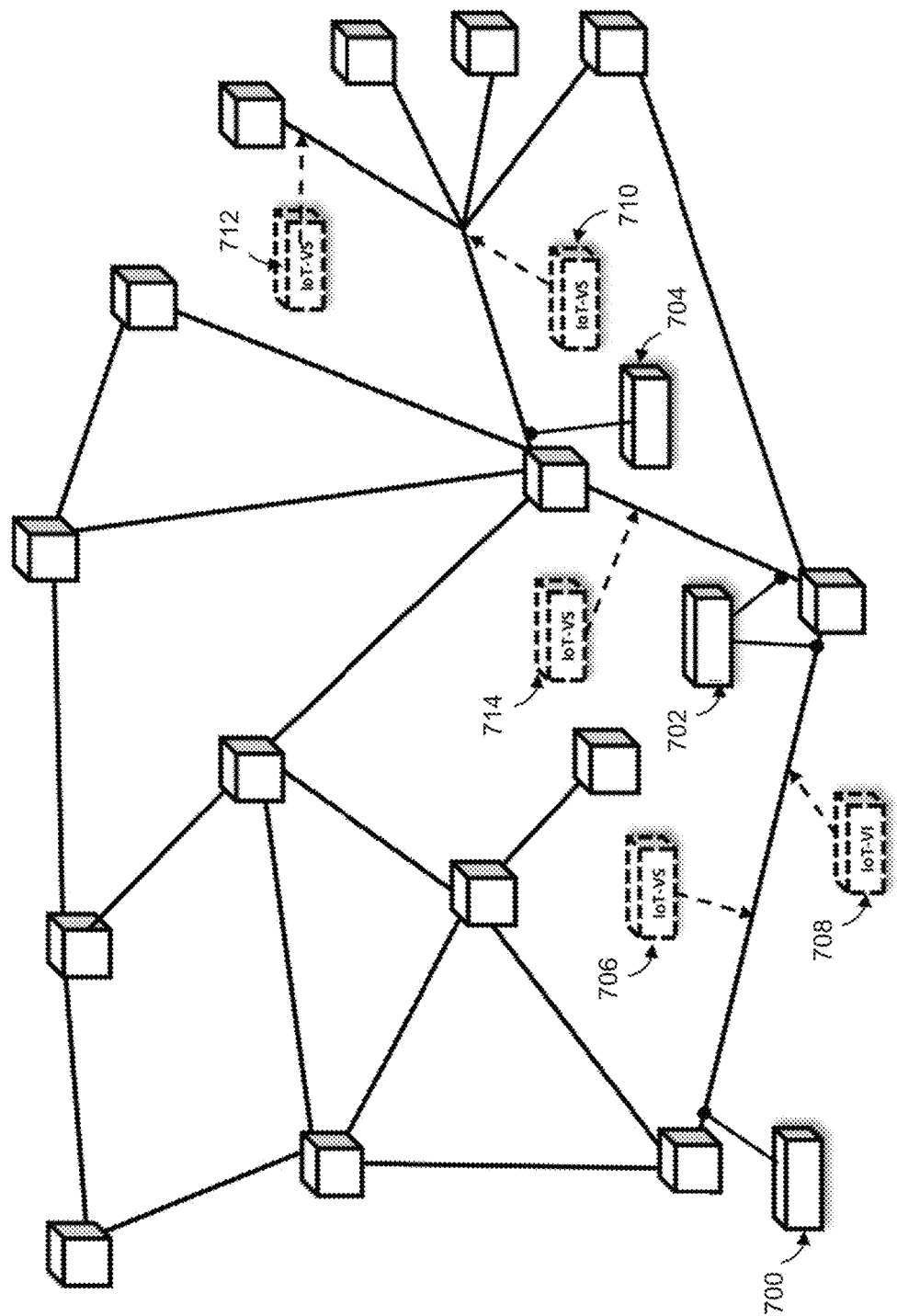
FIG. 7 illustrates an application on a telecommunications network that interconnects multiple equipment by fiber links to illustrate operation of the fiber optic virtual sensing system of FIG. 1A in accordance with an example of the present disclosure.

FIG. 7 illustrates an application on a telecommunications network that interconnects multiple equipment by fiber links to illustrate operation of the system 100 in accordance with an example of the present disclosure.

Referring to FIG. 7, more than one instance of the DUT interrogator 108 may be connected to a DUT (or a plurality of DUTs) in order to extend capabilities such as both end measurement of a DUT 104. In a similar manner, the multiple instantiations of the DUT interrogator 108 may be used in higher complexity fiber optic network topologies, such as passive optical networks, or wavelength division multiplexing networks.

For example, FIG. 7 shows an application on a telecommunications network that interconnects multiple equipment by fiber links. DUT interrogators at 700, 702, and 704 may be optically connected to a network fiber to build up a new range of virtual devices 706, 708, 710, 712, and 714. Any fiber section in optical continuity to another may benefit from the system 100.

Figure 8A:
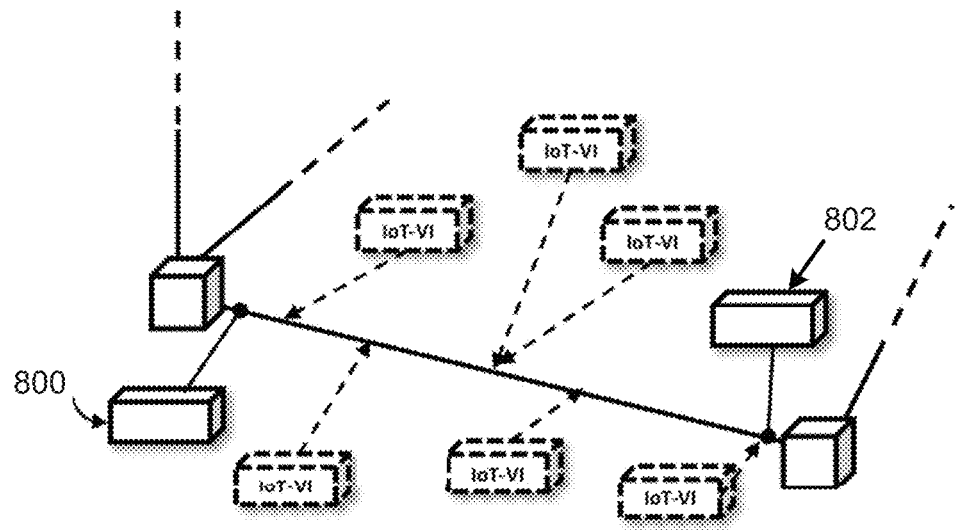
FIG. 8A illustrates a physical and hardware approach.
Figure 8B:
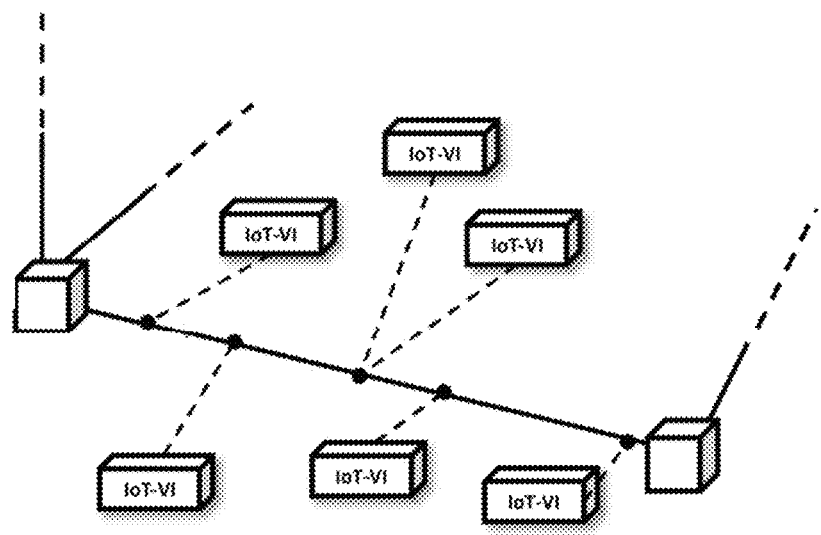
FIG. 8B illustrates an application oriented approach to illustrate operation of the fiber optic virtual sensing system of FIG. 1A in accordance with an example of the present disclosure.

FIG. 8A illustrates a physical and hardware approach, and FIG. 8B illustrates an application oriented approach to illustrate operation of the system 100 in accordance with an example of the present disclosure.

Referring to FIGS. 8A and 8B, masking the DUT interrogator 108 connected physically to the DUTs may provide another example of operation of the system 100. In FIGS. 8A and 8B, the virtual devices or virtual instruments may be deployed, moved, and/or configured to cover multiple applications. These virtual units may be used both in telecommunications, or sensing applications separately or together. For example, in FIG. 8A, the DUT interrogators may be disposed at 800 and 802, and the virtual sensors illustrated as IoT-V1 may be deployed, moved, and/or configured to cover multiple applications. FIG. 8B similarly shows virtual sensors illustrated as IoT-V1 that may be deployed, moved, and/or configured to cover multiple applications.

In the telecommunications domain, these mobile virtual tool kits may include virtual mobile standalone instruments, features, and systems, such as OTDR or loss test set or on demand insertion loss meter, fault locators, as well as monitoring systems that may be installed temporarily or permanently on the network. For maintenance and troubleshooting purposes, these tool kits may be activated on demand from mobile platforms such as smartphones. Monitoring applications may extract, compress, filter, correlate, distribute data, and provide usable measurements for quick time detection, analysis and reporting, or collect data overtime to provide offline analysis of historical information.

Figure 9:
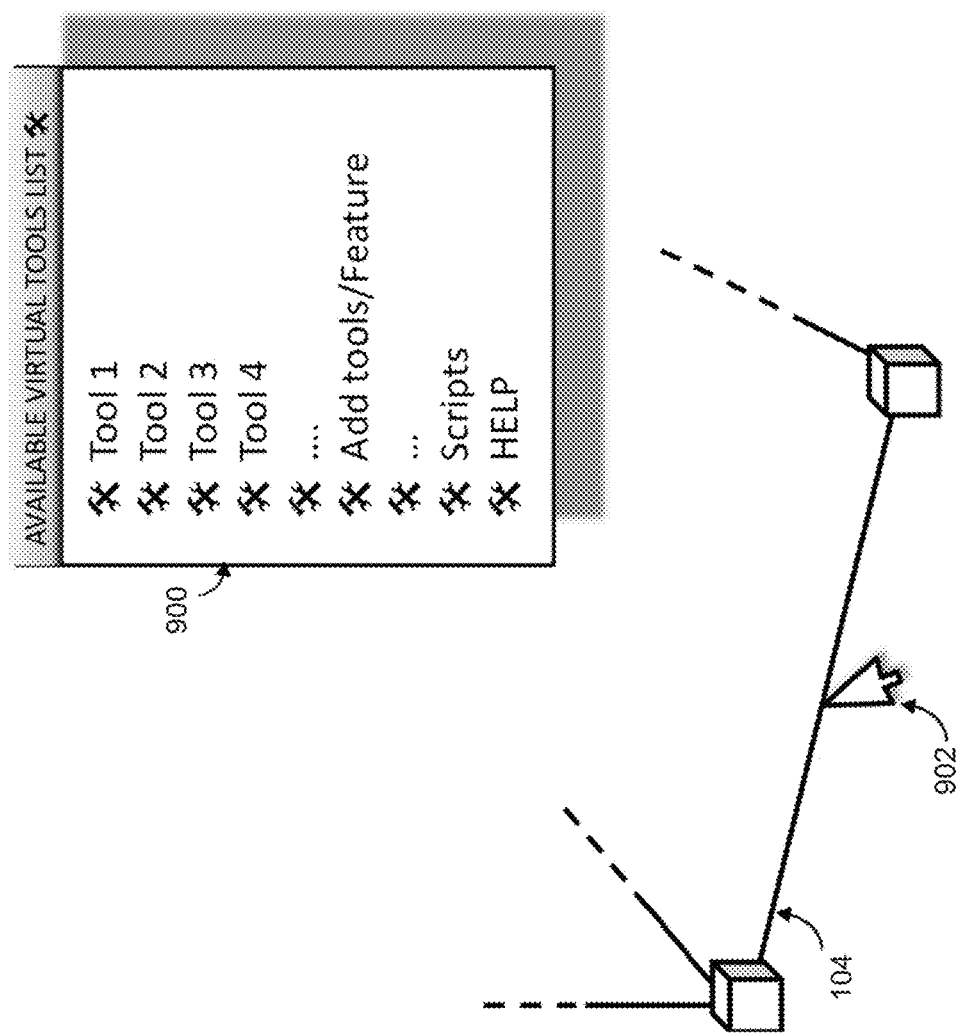
FIG. 9 illustrates a graphical user interface display to generate virtual sensors to illustrate operation of the fiber optic virtual sensing system of FIG. 1A in accordance with an example of the present disclosure.

FIG. 9 illustrates a graphical user interface display to generate virtual sensors to illustrate operation of the system 100 in accordance with an example of the present disclosure.

Referring to FIG. 9, an interface 900 may be provided to facilitate selection of available tools, and measurement or sensing capabilities at a point along the DUT 104. For example, a user may point at a location of the DUT 104 as shown at 902, and the user may be provided an option to select available tools (e.g., virtual sensors), and measurement or sensing capabilities implemented by the system 100.

FIG. 10 illustrate a flowchart of a method 1000 for fiber optic virtual sensing, according to examples. The method 1000 may be implemented on the system 100 described above with reference to FIGS. 1A-9 by way of example and not limitation. The method 1000 may be practiced in other systems.

Referring to FIGS. 1A-10, and particularly FIG. 10, at block 1002, the method 1000 may include generating one or more virtual sensors 106 along a DUT 104.

At block 1004, the method 1000 may include transmitting a stimulus optical signal into the DUT 104.

At block 1006, the method 1000 may include analyzing reflected light resulting from the transmitted stimulus optical signal.

At block 1008, the method 1000 may include determining, based on the analysis of the reflected light, an attribute of the DUT 104 sensed by the one or more virtual sensors 106.

Figure 11:
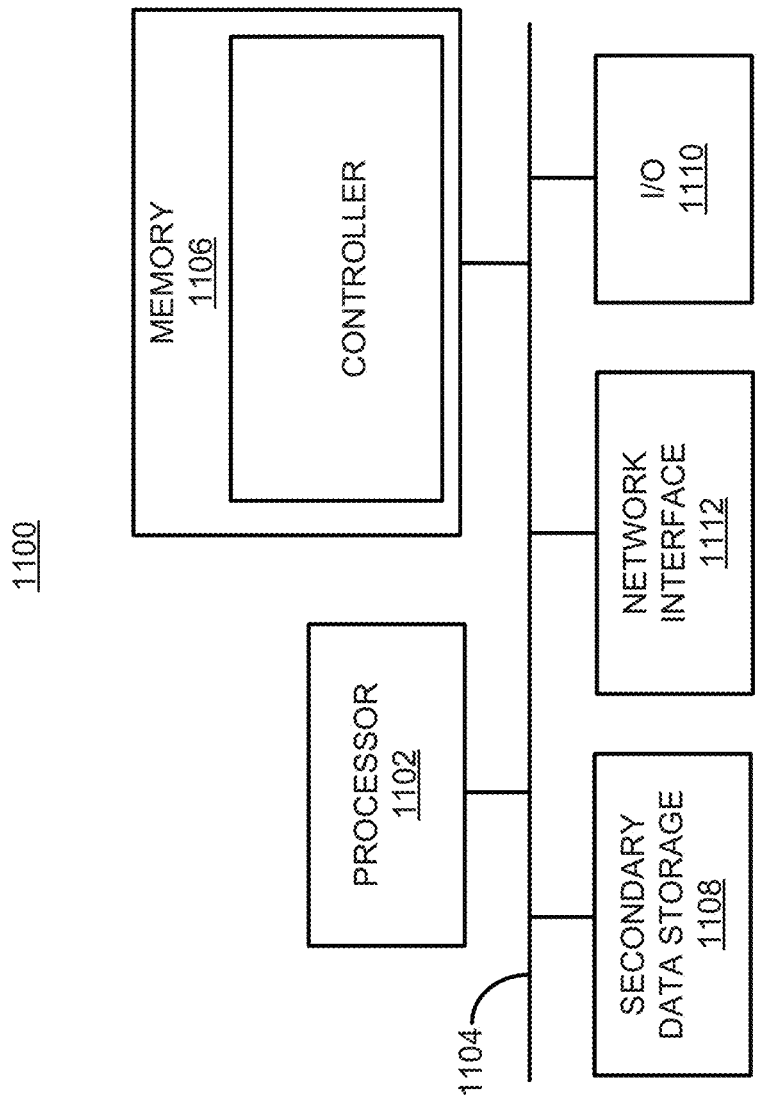
FIG. 11 illustrates a computer system, according to an example of the present disclosure.

FIG. 11 shows a computer system 1100 that may be used with the examples described herein. The computer system may represent a platform that includes components that may be in a server or another computer system. The computer system 1100 may be used as part of a platform for controllers of the system 100 (generally designated controller in FIG. 11). The computer system 1100 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1100 may include a processor 1102 that may implement or execute machine readable instructions performing some or all of the methods, functions and other processes described herein. Commands and data from the processor 1102 may be communicated over a communication bus 1104. The computer system may also include a main memory 1106, such as a random access memory (RAM), where the machine readable instructions and data for the processor 1102 may reside during runtime, and a secondary data storage 1108, which may be non-volatile and stores machine readable instructions and data. The memory and data storage are examples of computer readable mediums. The main memory 1106 may include the controller (e.g., for the system 100) including machine readable instructions residing in the main memory 1106 during runtime and executed by the processor 1102.

The computer system 1100 may include an input/output (I/O) device 1110, such as a keyboard, a mouse, a display, etc. The computer system may include a network interface 1112 for connecting to a network. Other known electronic components may be added or substituted in the computer system.

The processor 1102 may be designated as a hardware processor. The processor 1102 may execute operations associated with various components of the system 100. For example, the processor 1102 may execute operations associated with the controller (e.g., for the system 100), etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A fiber optic virtual sensing system comprising:
a virtual sensor generator, operatively connected to a device under test (DUT), to generate virtual sensors along the DUT by
receiving, from a plurality of virtual sensor generation tools that include a tool to a generate a virtual optical time domain reflectometer (OTDR) that includes an optical source and a power meter to measure an event loss of a fiber optic component disposed at a location along the DUT, sensing properties for the virtual sensors;

generating, based on the received sensing properties, at least one first virtual sensor to sense a property of the DUT along a specified length of the DUT that is less than an entire length of the DUT, and generating, based on the received sensing properties, at least one second virtual sensor to sense another property of the DUT along the entire length of the DUT, or generating, based on the received sensing properties, the at least one second virtual sensor to sense the another property of the DUT at a point along the DUT; and a DUT interrogator, operatively connected to the DUT, to:
transmit a stimulus optical signal into the DUT;
analyze reflected light resulting from the transmitted stimulus optical signal; and
determine, based on the analysis of the reflected light, an attribute of the DUT sensed by the virtual sensors.

2. The fiber optic virtual sensing system according to claim 1, wherein the DUT includes an optical fiber.

3. The fiber optic virtual sensing system according to claim 1, further comprising:
an Internet of Things (IoT) interface, operatively connected to an object, to transmit the attribute of the DUT to the object, wherein an operation of the object is to be controlled based on the transmitted attribute of the DUT.

4. The fiber optic virtual sensing system according to claim 1, wherein the virtual sensor generator is operatively connected to the DUT to move an existing virtual sensor from a first location to a second location along the DUT.

5. The fiber optic virtual sensing system according to claim 1, wherein the virtual sensor generator is operatively connected to the DUT to remove an existing virtual sensor.

6. The fiber optic virtual sensing system according to claim 1, wherein the DUT interrogator is operatively connected to the DUT to analyze reflected light resulting from the transmitted stimulus optical signal to measure insertion loss of a fiber optic component disposed at a location along the DUT.

7. The fiber optic virtual sensing system according to claim 6, wherein the virtual sensors include a loss test sensor that includes the optical source and the power meter to measure event loss associated with the fiber optic component.

8. The fiber optic virtual sensing system according to claim 1, wherein the virtual sensors include a fiber section optical loss sensor to measure optical attenuation associated with a section of the DUT.

9. The fiber optic virtual sensing system according to claim 1, wherein the virtual sensors include a fiber section temperature sensor to measure temperature associated with a section of the DUT.

10. The fiber optic virtual sensing system according to claim 1, wherein the virtual sensors include a fiber section strain sensor to measure strain associated with a section of the DUT.

11. The fiber optic virtual sensing system according to claim 1, wherein the DUT interrogator is operatively connected generally adjacent to a first end of the DUT, further comprising:

another DUT interrogator, operatively connected generally adjacent to a second end of the DUT that is generally opposite to the first end of the DUT, to:
transmit a further stimulus optical signal into the DUT in a direction from the second end of the DUT towards the first end of the DUT;
analyze further reflected light resulting from the transmitted further stimulus optical signal; and
determine, based on the analysis of the further reflected light, another attribute of the DUT sensed by the virtual sensors.

12. The fiber optic virtual sensing system according to claim 1, wherein the virtual sensor generator is operatively connected to the DUT to generate the virtual sensors along the DUT by:
utilizing distributed fiber-optic data from along the DUT and non-distributed fiber-optic data that includes a point measurement that includes a power measurement from a device that includes a physical power meter connected to the DUT.

13. The fiber optic virtual sensing system according to claim 1, wherein the virtual sensor generator is operatively connected to the DUT to generate the virtual sensors along the DUT by:
generating the at least one first virtual sensor to overlap a length of the DUT monitored by the at least one second virtual sensor.

14. The fiber optic virtual sensing system according to claim 1, wherein the DUT includes an optical fiber that is deployed in a three-dimensional geometric pattern.

15. A fiber optic virtual sensing system comprising:
a plurality of virtual sensor generation tools that are displayable to generate virtual sensors, including a virtual optical time domain reflectometer (OTDR) sensor that includes an optical source and a power meter to measure an event loss of a fiber optic component disposed at a location along a device under test (DUT);
a virtual sensor generator to
generate at least one virtual sensor, including the virtual OTDR sensor, along the DUT based on at least one of the plurality of virtual sensor generation tools, and
move at least one existing virtual sensor from a first location to a second location along the DUT based on input received via the at least one of the plurality of virtual sensor generation tools; and
a DUT interrogator, operatively connected to the DUT, to:
transmit a stimulus optical signal into the DUT;
analyze reflected light resulting from the transmitted stimulus optical signal; and
determine, based on the analysis of the reflected light, an attribute of the DUT sensed by the generated at least one virtual sensor and the moved at least one existing virtual sensor.

16. A fiber optic virtual sensing method comprising:
moving a plurality of existing virtual sensors from a first location to a second location along a device under test (DUT), wherein the plurality of existing virtual sensors includes a first virtual sensor and a second virtual sensor that represent a link budget loss meter to determine budget loss of the DUT;
transmitting a stimulus optical signal into the DUT;
analyzing reflected light resulting from the transmitted stimulus optical signal; and
determining, based on the analysis of the reflected light, an attribute of the DUT sensed by the moved plurality of existing virtual sensors by combining measurements from the plurality of virtual sensors, wherein the combining of the measurements includes subtracting a loss determined by the first virtual sensor from a loss determined by the second virtual sensor.

17. The fiber optic virtual sensing method according to claim 16, wherein the DUT includes a fiber optic cable.

18. The fiber optic virtual sensing method according to claim 16, further comprising:
   transmitting the attribute of the DUT to an Internet of Things (IoT) object; and
   controlling, based on the transmitted attribute of the DUT, an operation of the object.

* * * * *